United States Patent [19]

Thonissen

[11] 4,192,416
[45] Mar. 11, 1980

[54] DEVICE FOR TRANSFERRING PIECE MATERIAL, IN PARTICULAR PIECES OF FRUIT OR VEGETABLE

[75] Inventor: Willi Thonissen, Nettetal, Fed. Rep. of Germany

[73] Assignee: NIKO Konserven-Maschinenfabrik Hinsbek GmbH & Co., KG, Nettetal, Fed. Rep. of Germany

[21] Appl. No.: 892,506

[22] Filed: Apr. 3, 1978

[30] Foreign Application Priority Data

Apr. 1, 1977 [DE] Fed. Rep. of Germany ....... 2714594

[51] Int. Cl.² ...................... B65G 47/26; B64G 47/66
[52] U.S. Cl. .................................. 198/433; 198/424; 198/448; 198/457
[58] Field of Search .................. 53/236, 244; 198/393, 198/397, 424, 432, 433, 448, 457, 523, 539, 560, 561, 569, 735

[56] References Cited

U.S. PATENT DOCUMENTS 3,981,394  9/1976  Slathar et al. .................... 198/457

Primary Examiner—Jeffrey V. Nase
Attorney, Agent, or Firm—Herbert E. Kidder

[57] ABSTRACT

Apparatus for conveying elongated work pieces, such as cucumbers and the like, from a charging station to a transfer zone, and then transferring the pieces into containers such as cans or jars which are arranged in line below the transfer station. The conveyor comprises a plurality of transversely arranged scrapers which slide along the top surface of a horizontal conveyor table from the charging station to the transfer zone. The scrapers are preferably triangular in cross section, with bases flat on the table top and apices at the top. The open space between scrapers is slightly greater than the width of the work pieces, and the height of the scrapers is substantially equal to or less than the height of the work pieces. In the transfer zone, the conveyor table has an opening extending diagonally across the full width of the conveyor and the work pieces drop through this opening onto an inclined slide, which guides the work pieces into the containers.

4 Claims, 2 Drawing Figures

DEVICE FOR TRANSFERRING PIECE MATERIAL, IN PARTICULAR PIECES OF FRUIT OR VEGETABLE

BACKGROUND OF THE INVENTION

This invention pertains to a device for transferring work pieces, in particular pieces of fruit or vegetable, which are transported by a conveyor to a transfer zone extending along a conveyor section, and are then transferred to containers placed in a row below the transfer zone, in particular cans or jars.

By such a device, items such as cucumbers, paprika pods or the like are filled in a plurality of cans or jars, which are then processed further.

Apparatus is known in the art for transporting cucumbers, paprika pods and the like on a conveyor belt which, in the transfer zone, several strippers are arranged side by side, which seize cucumbers taken along on a certain longitudinal strip of the conveyor belt and gradually move them to the edge of the conveyor belt, over which they then fall into the cans or jars which are held in readiness. The strippers form between them passage openings for the cucumbers arranged over the conveyor belt and must be moved back and forth in an oscillating manner, transverse to the transport direction, so as to avoid accumulation in front of the passage openings. This requires a relatively expensive construction. It is disadvantageous also that cucumbers or other piece goods of delicate surface are subjected to mechanical stress on the one hand by the reciprocating movement of the strippers and, on the other, by guiding at the strippers transversely to the transport direction, so that damage is inevitable.

Another apparatus known in the art also has a conveyor belt on which the cucumbers are transported into the transfer zone. Above the transfer zone is a shaft extending substantially in transport direction, with blade type wings which, upon rotation of the shaft, seize the cucumbers lying on the conveyor belt and push them over the edge of the conveyor belt so that they can fall into the cans or jars held in readiness. With this device, too, the above-described disadvantages result.

SUMMARY OF THE INVENTION

It is the primary object of the invention to provide a simplified construction for the transfer, and at the same time to achieve a gentler handling of the cucumbers.

This problem is solved in that the conveyor has scrapers which are slidably arranged above the flat top surface of a conveyor table arranged at least in the region of the conveyor section, and that in the transfer zone the conveyor table has an opening of increasing width in the direction of travel of the conveyor.

Any additional means which brings the transported work piece over the edge of the conveyor crosswise to the transport direction can be dispensed with, because the work piece seized by the scrapers is transported along into the region of the opening, where, according to its position on the conveyor table and according to the form of the opening, it leaves the conveyor at a certain point of the transfer zone and falls into one of the containers held in readiness. A movement of the pieve crosswise to the transport direction is not necessary so that the work piece as a whole is also handled more gently. Even items with delicate surfaces, such as certain types of vegetable, are not under any special stress, because the bottom of the vat is made of a material of low coefficient of friction, and besides, sufficient lubrication is achieved by water or the like.

Advantageously, the opening in the end of the transfer zone extends substantially over the full width of the conveyor table, so that the conveyor is completely emptied at the end of the transfer zone.

A uniform distribution of the work pieces brought up on the conveyor into the containers arranged below the transfer zone is obtained when the width of the opening increases linearly in transport direction. To this end, the edge of the bottom is advantageously cut off at a slant between the beginning and the end of the transfer zone, starting on one side up to the other side.

To achieve a gentle handling of the work pieces during transfer from the conveyor into the containers, a slide area leading to and over the containers may be arranged below the opening. The slide area should have substantially constant inclination.

When known equipments of the above-described kind are used to fill elongated items, such as cucumbers, paprika pods, and the like, in cans or jars, there are needed, in addition to the means which bring the material over the edge of the conveyor belt, means for aligning the elongated items so that they fall into the cans or jars in the desired arrangement. For example, cucumbers are to be filled into the cans or jars so that they stand substantially upright in the can or jar. For this purpose, grates forming channels for the cucumbers are arranged below the transfer point and above the containers. The cucumbers are aligned as they pass through the grates and then fall into the containers held in readiness in the desired arrangement.

In the apparatus of the precent invention, this alignment of elongated objects required for certain purposes can be accomplished by the conveyor also if the scrapers have a cross-section of increasing width toward the bottom of the vat. For then the elongated objects, such as cucumbers, are already ordered on being charged on the conveyor, i.e., the cucumbers place themselves between the scrapers so that their longitudinal axes are substantially perpendicular to the direction of travel. Since several cucumbers lie one behind the other over the width of the conveyor, they fall into the containers one after the other when their centers of gravity pass over the slanting edge of the bottom in the region of the opening. The aligning can best be achieved with scrapers having a substantially triangular cross-section.

To ensure that all produce extrained by the conveyor is transferred to the containers held in readiness, the spacing between the scrapers above the conveyor table should be substantially equal to or greater than the width or diameter of the item conveyed. In addition, the height of the scrapers above the conveyor table should be substantially equal or smaller than the height or diameter of the item conveyed, so as to prevent the work pieces from piling up one above the other between the scrapers. Thus, at the same time, the quantity of material conveyed per unit of time is limited or maintained constant, and this occurs in the region where work pieces are charged on the conveyor.

Generally, the measures described are sufficient for maintaining a desired distribution in the transfer zone or for aligning the transported material. This is true also of the transfer in the region of the slide area on which the individual work pieces slide into the region of the containers. Additionally, the slide area may present grooves extending in the slide direction and whose width substantially corresponds to the spacing of the scrapers. In this manner, variations in alignment in the region of the slide area are prevented.

In the following, an embodiment of the invention illustrated in the drawings will be explained:

DESCRIPTION OF THE PREFERRED EMBODIMENT

Figure 1:
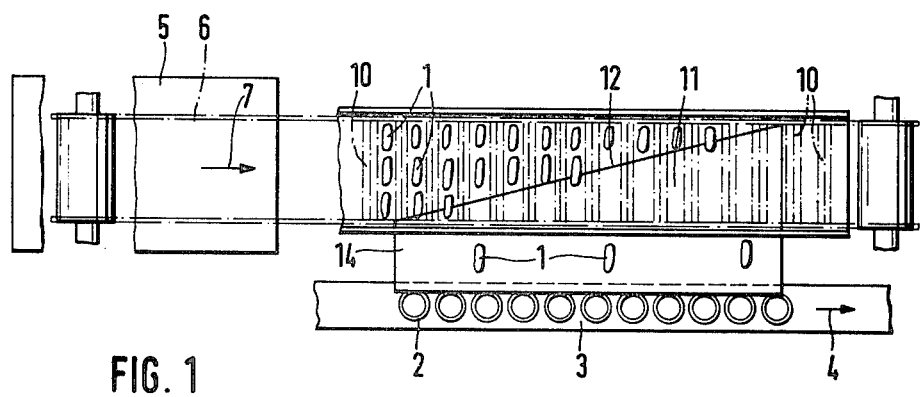
FIG. 1 is a diagrammatic plan view, showing the apparatus of the invention for loading cucumbers into cans or jars.
Figure 2:
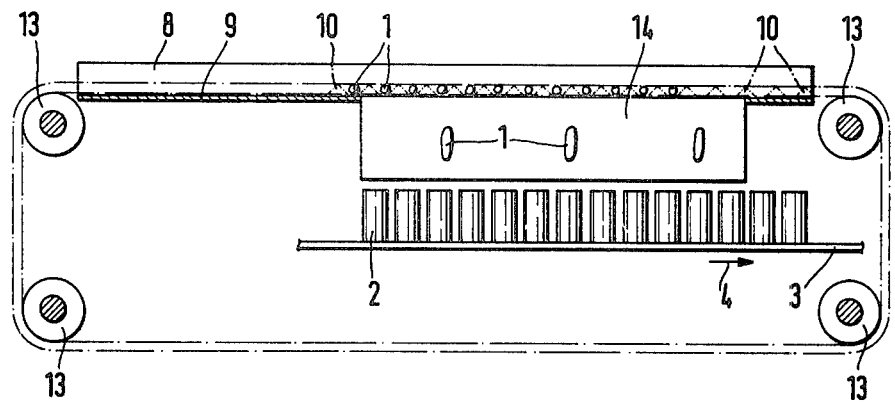
FIG. 2 is a side elevation of the apparatus in FIG. 1.

With the device shown in the drawings, cucumbers 1 are to be filled in cans 2 or jars, which are arranged one behind the other on a conveyor 3 and are transported by it in the direction of arrow 4. The cucumbers 1 are received at a charging station 5 by means of a conveyor 6 which transports them in the direction of the arrows 7 to a transfer zone and then transfers them to the cans 2.

The conveyor 6 has an elongated conveyor table 8 with a flat top surface 9, over which scrapers 10 are guided in the direction of arrow 7, by means of chains or the like.

In the transfer zone, the bottom 9 of conveyor table 8 is partially removed so that an opening 11 is formed, which extends between the beginning and end of the transfer zone. The edge 12 of bottom 9, defining the opening 11, runs straight between the beginning and end of the transfer zone, so that the width of the opening 11 increases uniformly between the beginning and end of the transfer zone. At the end of the transfer zone the opening 11 extends over the full width of the bottom 9.

The scrapers 10 are carried over guide rollers 13 by their chains, not shown in detail. They have a substantially triangular cross-section, their height being equal to or smaller than the diameter of the cucumbers 1 transported by the conveyors 6, and each adjacent pair of scrapers being spaced apart from one another directly above the bottom 9 by a distance equal to or greater than the diameter of the cucumbers.

The device shown operates as follows: At the charging station 5, cucumbers 1 are put on the conveyor 6. At first the cucumbers fall in a random manner on the conveyor 6 and between the scrapers 10. Then the cucumbers 1 are so aligned by the scrapers of triangular cross-section that several cucumbers lie end-to-end, three in the illustrated embodiment, between each two adjacent scrapers 10. As the height of the scrapers 10 is equal to or smaller than diameter of the cucmbers, only one layer of cucumbers is taken along by the scrapers 10 each time. If desired, a stripper or the like may further be arranged above the scrapers 10.

The cucumbers 1, thus aligned, are then transported into the transfer zone, where they drop over the edge 12, every time the center of gravity of a cucumber passes over the edge 12 and the opening 11, falling onto an inclined slide plate 14, which in the transfer zone, is contiguous to the edge 12 and extends over the top ends of the cans 2. Slide plate 14 has a substantially constant inclination, so that the cucumbers all fall into the cans 2 at substantially the same speed and as illustrated in the embodiment. Not illustrated in the embodiment is that the slide plate 14 may have grooves which extend in slide direction, and which prevent the alignment of the cucumbers from changing as they slide down.

What I claim is:

1. In apparatus for transferring work pieces, in particular for elongated items such as cucumbers and the like, which are transported by a conveyor from a charging station to a transfer zone extending along a conveyor section, and the work pieces being then transferred to containers placed in a row below the transfer zone, the improvement comprising:

a conveyor (6) having a plurality of parallel scrapers (10) arranged transverse to the direction of travel, said scrapers being spaced apart from one another a distance greater than the width of the work pieces, whereby the work pieces can lie between adjacent pairs of scrapers and be pushed along thereby;

said scrapers sliding on the top surface (9) of a horizontal conveyor table (8) extending from the charging station (5) to the transfer zone; and the scrapers (10) having a cross-section of increasing width toward the conveyor table surface (9);

said conveyor table having an opening (11) in the transfer zone through which the work pieces drop when said scrapers pass over the opening, said opening increasing in width along the direction of travel of the conveyor; and means below said opening for guiding the work pieces into the containers below the transfer zone as the work pieces drop through the opening.

2. Apparatus according to claim 1, characterized in that the scrapers (10) have a substantially triangular cross-section.

3. Apparatus according to claim 1, characterized in that the height of the scrapers (10) above the conveyor table surface (9) is substantially equal to or smaller than the height or diameter of the work piece.

4. Apparatus according to claim 1, characterized in that said means below the opening (11) comprises an inclined slide area (14) which leads to and over the containers (2) so that work pieces falling down the slide area drop into the containers.

* * * * *